US010028107B1

(12) United States Patent
Vivanco et al.

(10) Patent No.: US 10,028,107 B1
(45) Date of Patent: Jul. 17, 2018

(54) DYNAMIC MBMS NETWORK RECONFIGURATION

(71) Applicant: Sprint Spectrum LP, Overland Park, KS (US)

(72) Inventors: Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 514 days.

(21) Appl. No.: 13/938,070

(22) Filed: Jul. 9, 2013

(51) Int. Cl.
*H04W 4/06* (2009.01)

(52) U.S. Cl.
CPC ..................... *H04W 4/06* (2013.01)

(58) Field of Classification Search
None
See application file for complete search history.

(56) References Cited

U.S. PATENT DOCUMENTS

| | | | | |
|---|---|---|---|---|
| 8,184,570 | B2* | 5/2012 | Chun | H04L 1/1893 370/225 |
| 8,320,292 | B2* | 11/2012 | Dorenbosch | H04W 72/005 370/312 |
| 2004/0184471 | A1* | 9/2004 | Chuah | H04L 1/08 370/420 |
| 2008/0267109 | A1* | 10/2008 | Wang | H04W 72/005 370/312 |
| 2008/0316952 | A1* | 12/2008 | Gruber | H04W 72/005 370/312 |
| 2010/0110961 | A1* | 5/2010 | Chao | H04W 76/002 370/312 |
| 2010/0165905 | A1* | 7/2010 | Kanazawa | H04W 72/005 370/312 |
| 2010/0203886 | A1* | 8/2010 | Nobukiyo | H04W 72/005 455/434 |
| 2011/0021224 | A1* | 1/2011 | Koskinen | H04W 72/005 455/507 |
| 2011/0116433 | A1* | 5/2011 | Dorenbosch | H04W 72/005 370/312 |
| 2012/0020275 | A1* | 1/2012 | Wei | H04L 1/188 370/312 |
| 2012/0099419 | A1* | 4/2012 | Kim | H04L 1/1854 370/216 |
| 2012/0195221 | A1* | 8/2012 | Wang | H04W 72/005 370/252 |
| 2012/0213100 | A1* | 8/2012 | Cheng | H04L 12/189 370/252 |
| 2012/0243486 | A1* | 9/2012 | Zeira | H04B 7/0417 370/329 |
| 2014/0192697 | A1* | 7/2014 | Anchan | H04W 72/005 370/312 |
| 2014/0286222 | A1* | 9/2014 | Yu | H04W 4/08 370/312 |

(Continued)

*Primary Examiner* — Suk Jin Kang

(57) ABSTRACT

Systems and methods for operating a wireless communication system are provided. A network node can determine a number of access nodes transmitting data using a first multimedia broadcast multicast services (MBMS) mode. A number of retransmission requests received at each access node transmitting data using the first MBMS mode can be determined. At least one access node can be reconfigured to transmit data from the first MBMS mode to a second MBMS mode based on the number of retransmission requests received from each access node.

19 Claims, 6 Drawing Sheets

(56) References Cited

U.S. PATENT DOCUMENTS

2014/0301267 A1* 10/2014 Gou .................. H04W 48/08
                                                370/312
2014/0341104 A1* 11/2014 Zhao ................. H04W 48/00
                                                370/312
2015/0036580 A1*  2/2015 Siomina ............. H04L 1/1854
                                                370/312

* cited by examiner

DYNAMIC MBMS NETWORK RECONFIGURATION

TECHNICAL BACKGROUND

Multimedia Broadcast and Multicast Services (MBMS) is a point-to-multipoint service in which data is transmitted from a single source to multiple destinations over a communication network in one or more consecutive sessions of finite duration. Data can be transmitted using various MBMS modes. For example, in a single cell (SC) MBMS mode, each base station schedules and transmits data independently of all other base stations. In a multimedia broadcast single frequency network (MBSFN) MBMS mode, a group of base stations are synchronized to transmit data at the same time and frequency. Wireless devices can receive multiple versions the data from a plurality of base stations within the group and delays between the different versions can be based on the location of the wireless device relative to the group of base stations. For example, the closer the wireless device is to a base station, the less delay the data will have. The further away the wireless device is from a base station, the greater the delay.

In SC MBMS mode, service performance can vary within the service area and subscribers located at the edges of the service area may experience service interruption due to a decrease in signal strength. MBSFN MBMS mode can provide an improvement in service performance to subscribers at the edge of the service area of each base station because of combined signal strength from a plurality of base stations. However, MBSFN MBMS mode can consume significant network resources due to the amount of overhead generated to synchronize the data transmission from the plurality of base stations.

Overview

Systems and methods for operating a wireless communication system are provided. A network node can determine a number of access nodes transmitting data using a first multimedia broadcast multicast services (MBMS) mode. A number of retransmission requests received at each access node transmitting data using the first MBMS mode can be determined. At least one access node can be reconfigured to transmit data from the first MBMS mode to a second MBMS mode based on the number of retransmission requests received from each access node.

DETAILED DESCRIPTION

Figure 1:
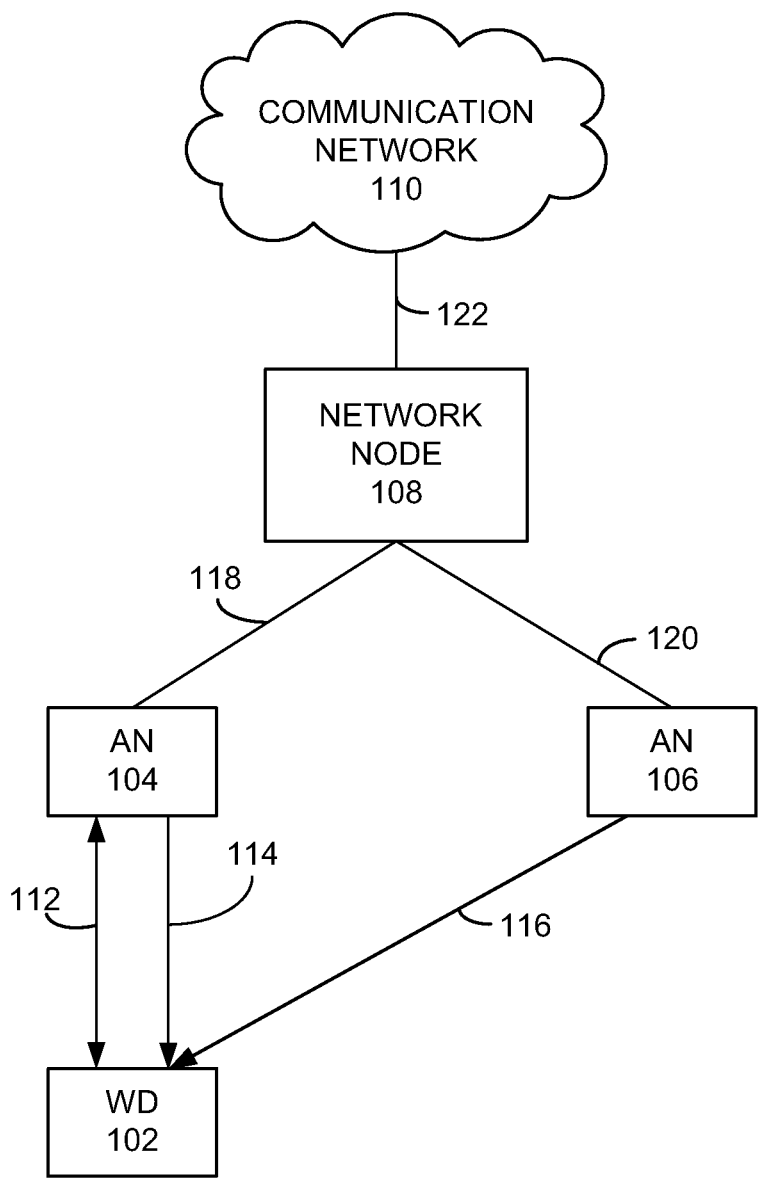
FIG. 1 illustrates an exemplary communication system.

FIG. 1 illustrates an exemplary communication system 100 for providing wireless communications to a wireless device. Communication system 100 can comprise wireless device 102, access node 104, access node 106, network node 108, and communication system 110. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication between network node 108 and communication network 110 which are omitted for clarity, including additional processing nodes, routers, gateways, and physical and/or wireless data links for carrying data among the various network elements.

Wireless device 102 can be any device configured to communicate over communication system 100 using a wireless interface. For example, wireless device 102 can include a cell phone, a smart phone, a computing platform such as a laptop, palmtop, or a tablet, a personal digital assistant, or an internet access device, and combinations thereof. Wireless device 102 can be configured to receive a multimedia broadcast multicast services (MBMS) signal. It is noted that while one wireless device is illustrated in FIG. 1 as being in communication with access nodes 104 and/or 106, any number of wireless devices can be implemented. For example, any number of wireless devices can receive the multicast MBMS signal from an access node.

Wireless device 102 can communicate with access node 104 through communication link 112. Communication link 112 can be a unicast connection established between wireless device 102 and access node 104 such that bi-directional information can be transmitted between the wireless device 102 and access node 104. For example, wireless device 102 can communicate retransmission requests to access node 104 over communication link 112. Wireless device 102 can receive MBMS signals from access node 104 through communication link 114 and from access node 106 through communication link 116. Communication links 114, 116 can be associated with the MBMS modes such that the links are a multicast unidirectional signal originating at the access nodes 104, 106 and received by wireless device 102. Communication links 112, 114, 116 can use various communication media, such as air, space, metal, optical fiber, or some other signal propagation path—including combinations thereof. Communication links 112, 114, 116 can comprise many different signals sharing the same link. Communication links 112, 114, 116 can also include multiple signals operating in a single "airpath" comprising beacon signals, user communications, communication sessions, overhead communications, frequencies, timeslots, transportation ports, logical transportation links, network sockets, packets, or communication directions. For example, user communications between wireless devices 102, 104, 106 and access nodes 104, 106 could share the same representative wireless links 112, 114, 116, but be transferred over different communication sessions, frequencies, timeslots, packets, ports, sockets, logical transport links—including combinations thereof.

Access nodes 104, 106 can be any access node configured to communicate with wireless device 102. For example, access nodes 104, 106 can be selected from a base transceiver station, a radio base station, an eNodeB device, or an enhanced eNodeB device. While not illustrated access nodes 104, 106 can be in direct communication with each other over a communication link.

Access nodes 104, 106 can be configured to provide wireless communications to wireless device 102 using various wireless services such as voice, data, video, etc. For example, access nodes 104, 106 can be configured to transmit data using a single cell (SC) MBMS mode or a multimedia broadcast single frequency network (MBSFN) MBMS mode. MBMS modes can be used to provide downlink transmission services such as streaming services (e.g. multimedia, video on demand, webcast) or background services (e.g. warning messages, bulk e-mail, short message services (SMS), downloading, local information, advertisements) to a plurality of wireless devices.

Access nodes 104, 106 can comprise a processor and associated circuitry to execute or direct the execution of computer-readable instructions to obtain information. Access nodes 104, 106 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 104, 106 can receive instructions and other input at a user interface.

Network node 108 can be any network node configured to manage the MBMS services within system 100. For example, network node 108 can determine a number of access nodes transmitting data using a first MBMS mode, determine a number of retransmission requests received at each access node transmitting data using the first MBMS mode, and reconfigure at least one access node to transmit data from the first MBMS mode to a second MBMS mode based on the number of retransmission requests received from each access node. Network node 108 can mediate between content providers and network operators such that the network node 108 formats control plane data and user plane data of the MBMS service where control plane data can be signaling data or control information such as control information associated with network interface or session management and user plane data can be payload data provided to the wireless device 102. The network node 108 can also authenticate and authorize content providers and/or service providers as well as transmit encrypted data to the communication network 110. Network node 108 can further provide information about its services for both service announcement and bearer setup purposes, authenticate a wireless device 102 that wishes to join a multicast session, and initiate MBMS session start, modify, and stop signaling. Network node 108 can provide other control and management functions for system 100. The network node 108 can be a single device having various functions or a plurality of devices having differing functions. For example, network node 108 can include at least one of a multi-cell/multicast coordination entity (MCE), a mobility management entity (MME), an e-MBMS gateway, an evolved broadcast multicast service center (e-BM-SC), an authentication, authorization, and accounting (AAA) node, a rights management server (RMS), a subscriber provisioning server (SPS), a policy server, and a combination thereof.

Network node 108 can comprise a processor and associated circuitry to execute or direct the execution of computer-readable instructions to obtain information. Network node 108 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Network node 108 can receive instructions and other input at a user interface.

Network node 108 can be in communication with access node 104 through communication link 118, access node 106 through communication link k120 and communication system 110 through communication link 122. Communication links 118, 120, 122 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 118, 120, 122 can be a direct link or might include various equipment, intermediate components, systems, and networks. Links 118, 120, 122 can include multiple signals operating in a single pathway in a similar manner as wireless links 112, 114, 116.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying data, for example, to support voice and data communications by a wireless device such as wireless devices 102,104, 106. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 can also comprise additional base stations, controller nodes, telephony switches, internet routers, network gateways, computer systems, communication links, or some other type of communication equipment, and combinations thereof.

In operation, access node 104 can transmit data to wireless device 102 over communication link 114 in one or more consecutive session of finite duration using a first MBMS mode such as a SC MBMS mode. A unicast communication link 112 can also be established between the wireless device 102 and the access node 104. The wireless device 102 can monitor the MBMS data transmission for errors using an error control method such as hybrid automatic repeat request (HARM). When the wireless device 102 successfully receives a packet of the data, the wireless device can send an ACK message to access node 104 over communication link 112 and when a corrupted data packet is received, the wireless device 102 can transmit retransmission request message, such as a NACK message, to access node 104. Network node 108 can monitor the number of retransmission request messages received by access node 104. The network node 108 can reconfigure access node 104 to initiate data transmission using a second MBMS mode such as MBSFN MBMS mode. In addition, access node 106 can also transmit data using the first MBMS mode to other wireless devices within the service area of access node 106. Network node 108 can further configure access node 106 to transmit data using the second MBMS mode based on the number of retransmission request messages received by access node 104 and/or access node 106.

Figure 2:
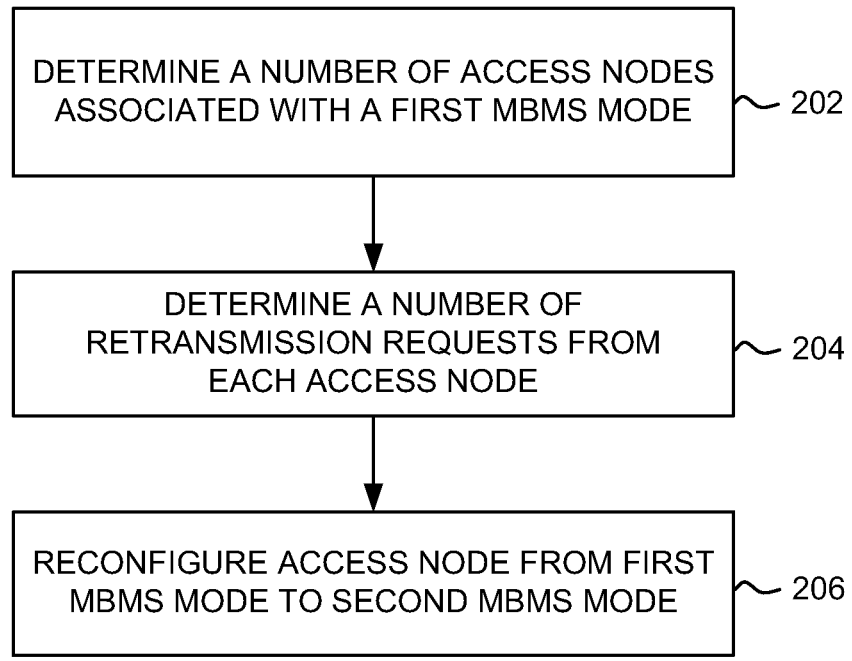
FIG. 2 illustrates an exemplary method of communicating with a wireless device in a wireless communication system.

FIG. 2 illustrates a flow chart of an exemplary method of communicating with a wireless device in a wireless communication system. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

A network node can determine a number of access nodes associated with a first MBMS mode at 202. For example, network node 108 can determine whether access node 104 and/or access node 106 are transmitting data using a first MBMS mode such as SC MBMS mode. When access nodes 104, 106 are transmitting data using the SC MBMS mode, the data can be transmitted on a channel unique to the service area of each access node 104, 106. For example, wireless device 102 can receive SC MBMS mode data transmissions from access node 104.

For each access node, a wireless device within the access node service area can establish a communication link such as a unicast link, separate from the multicast SC MBMS mode data transmissions with the associated access node. Any retransmission requests can be transmitted over the unicast communication link. At 204, the network node can monitor the number of retransmission requests from each network node. For example, while only one wireless device 102 is illustrated as receiving the data transmission using the SC MBMS mode over communication link 114, any number of wireless devices within the service area of the access node 104 can receive the multicast data transmission simultaneously. A service area associated with an access node can be considered a radio cell. In addition, while not illustrated in FIG. 1, any number of wireless devices can be in communication with access node 106 to receive a data transmission using a SC MBMS mode such that any wireless devices receiving data using the SC MBMS mode from access node 106 can establish a separate communication links with access node 106 to transmit retransmission request messages. The wireless devices can initiate sending the retransmission request messages or network node 108 can request retransmission request messages from the wireless devices. The retransmission request messages can be associated with an error control method such as HARQ. For example, an ACK message can be transmitted to access node 104 over communication link 112 when data is successfully received by wireless device 102 and when a corrupted data packet is received by the wireless device 102, a retransmission request message, such as a NACK message, can be sent to access node 104 from wireless device 102 over communication link 112. A similar error control method can be implemented between access node 106 and any wireless devices associated with the service area of access node 106.

A network node can monitor the number of retransmission requests from any access node transmitting data using a first MBMS mode. For example, network node 108 can monitor the number of retransmission request message received at access node 104 and access node 106.

An access node can be reconfigured from transmitting data using a first MBMS mode to transmitting data using a second MBMS mode based on the number of retransmission requests received at each access node. For example, access node 104 and/or access node 106 can be reconfigured to transmit data from a SC MBMS mode to a MBSFN MBMS mode. When access nodes 104, 106 are configured to transmit data using an MBSFN MBMS mode, access nodes 104, 106 can be synchronized to transmit the same signal over the same channel in service areas associated with access nodes 104, 106. Accordingly, wireless device 102 can receive multiple versions of the same signal with various amounts of delay depending on the location of the wireless device 102 relative to each access node 104, 106. The transmissions from access nodes 104, 106 can be sufficiently synchronized that each signal arrives at wireless device 102 within the cyclic prefix at the start of the symbol such that there is no inter-symbol interference (ISI).

In an embodiment, determining whether to reconfigure the MBMS data transmission mode provided by an access node can be based on retransmission messages such that when the number of retransmission request messages for each access node exceeds a predetermined criteria, network node 108 can reconfigure the MBMS mode of the access node. For example, as the number of retransmission requests increase per wireless device and/or the number of retransmissions requests per access node increases can be indicative of fading conditions experienced by at least one wireless device associated with the access node.

Figure 3:
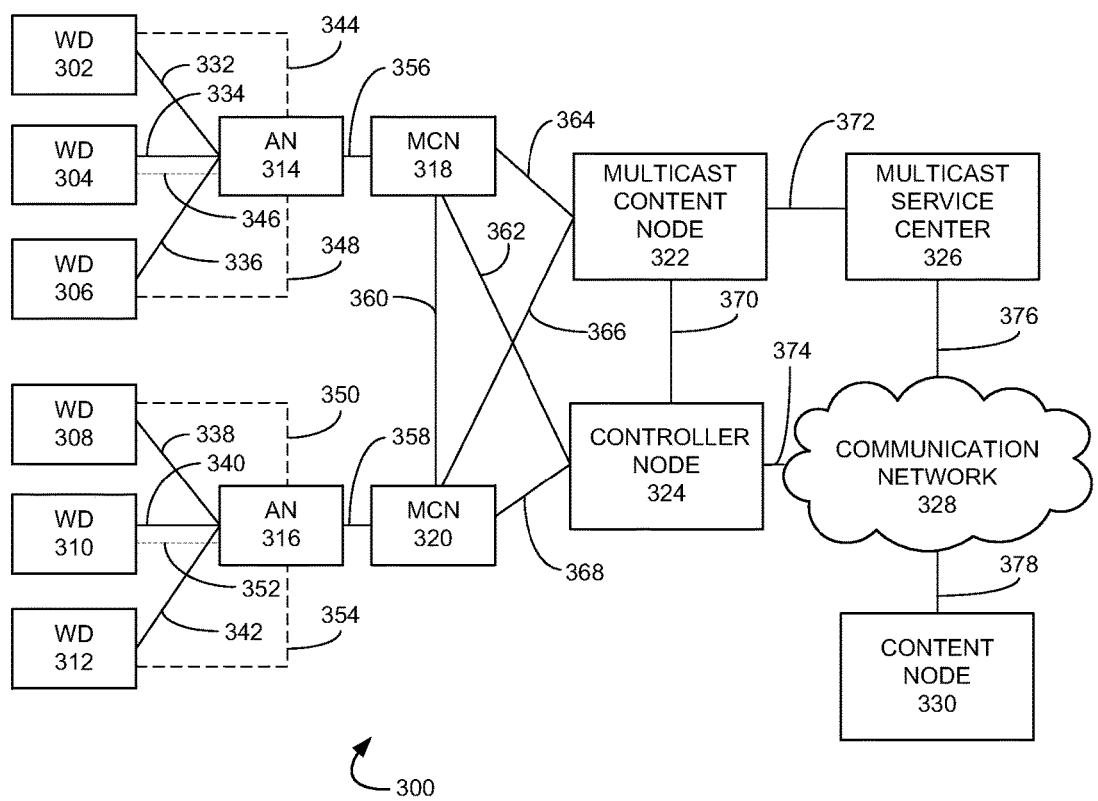
FIG. 3 illustrates another exemplary wireless communication system.

FIG. 3 illustrates an exemplary communication system 300 for providing wireless communications to a wireless device. Communication system 300 can comprise wireless devices 302, 304, 306, 308, 310, 312, access nodes 314, 316, multi-cell/multicast coordination nodes 318, 320, a multicast content node 322, a controller node 324, a multicast service center node 326, communication network 328, and content node 330. Other network elements may be present in the communication system 300 to facilitate communication but are omitted for clarity, such as base stations, base station controllers, gateways, mobile switching centers, dispatch application processors, and location registers such as a home location register or visitor location register. Furthermore, other network elements may be present to facilitate communication between wireless devices 302, 304, 306, 308, 310, 312 and communication network 328 which are omitted for clarity, including additional processing nodes, routers, gateways, and physical and/or wireless data links for carrying data among the various network elements.

Wireless devices 302, 304, 306, 308, 310, 312 can be any device configured to communicate over communication system 300 using a wireless interface. For example, wireless devices 302, 304, 306, 308, 310, 312 can include a cell phone, a smart phone, a computing platform such as a laptop, palmtop, or a tablet, a personal digital assistant, or an internet access device, and combinations thereof. Wireless devices 302, 304, 306, 308, 310, 312 can be configured to receive a multimedia broadcast multicast services (MBMS) signal. Any number of wireless devices can be associated with access nodes 314, 316 where any number of wireless devices associated with each access node 314, 316 can receive the multicast MBMS signal from the respective access node.

Wireless device 302 can communicate with access node 314 through communication link 332. Wireless device 304 can communicate with access node 314 through communication link 334. Wireless device 306 can communicate with access node 314 through communication link 336. Wireless device 308 can communicate with access node 316 through communication link 338. Wireless device 310 can communicate with access node 316 through communication link 342. Wireless device 312 can communicate with access node 316 through communication link 340. Communication links 332, 334, 336, 338, 340, 342 can be unicast connections established between each wireless device and the respective access node such that bi-directional information can be transmitted between the wireless devices and the access nodes. For example, any retransmission request messages from each wireless device 302, 304, 306, 308, 310, 312 can be transmitted over links 332, 334, 336, 338, 340, 342. Other unicast-type communications can be further transmitted between access nodes 314, 316 and wireless devices 302, 304, 306, 308, 310, 312.

Wireless device 302 can receive MBMS signals from access node 314 over communication link 344. Wireless device 304 can receive MBMS signals from access node 314 over communication link 346. Wireless device 306 can receive MBMS signals from access node 314 over communication link 348. Wireless device 308 can receive MBMS signals from access node 316 over communication link 350. Wireless device 310 can receive MBMS signals from access node 316 over communication link 352. Wireless device 312 can receive MBMS signals from access node 316 over communication link 354. Communication links 344, 346, 348, 350, 352, 354 can be associated with MBMS modes such that multicast unidirectional signals can be transmitted over links from access nodes 314, 316 to the associated wireless devices 302, 304, 306, 308, 310, 312.

Communication links 332, 334, 336, 338, 340, 342, 344, 346, 348, 350, 352, 354 can use various communication media, such as air, space, metal, optical fiber, or some other signal propagation path—including combinations thereof. Communication links 332, 334, 336, 338, 340, 342, 344, 346, 348, 350, 352, 354 can comprise many different signals sharing the same link. Communication links 332, 334, 336, 338, 340, 342, 344, 346, 348, 350, 352, 354 can also include multiple signals operating in a single "airpath" comprising beacon signals, user communications, communication sessions, overhead communications, frequencies, timeslots, transportation ports, logical transportation links, network sockets, packets, or communication directions. For example, user communications between wireless devices 302, 304, 306, 308, 310, 312 and access nodes 314, 316 could share the same representative wireless links 332, 334, 336, 338, 340, 342, 344, 346, 348, 350, 352, 354, but be transferred over different communication sessions, frequencies, timeslots, packets, ports, sockets, logical transport links—including combinations thereof.

Access nodes 314, 316 can be any access node configured to communicate with wireless devices 302, 304, 306, 308, 310, 312. For example, access nodes 314, 316 can be selected from a base transceiver station, a radio base station, an eNodeB device, or an enhanced eNodeB device.

Access nodes 314, 316 can be configured to provide wireless communications to wireless devices 302, 304, 306, 308, 310, 312 using various wireless services such as voice, data, video, etc. For example, access nodes 314, 316 can be configured to transmit data using a single cell (SC) MBMS mode or a multimedia broadcast single frequency network (MBSFN) MBMS mode. MBMS modes can be used to provide downlink transmission services such as streaming services (e.g. multimedia, video on demand, webcast) or background services (e.g. warning messages, bulk e-mail, short message services (SMS), downloading, local information, advertisements) to a plurality of wireless devices.

Access nodes 314, 316 can comprise a processor and associated circuitry to execute or direct the execution of computer-readable instructions to obtain information. Access nodes 314, 316 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 314, 316 can receive instructions and other input at a user interface.

Multi-cell/multicast coordination nodes (MCNs) 318, 320 can be configured to provide a MBMS control functions between access nodes 314, 316 and the network. For example, MCNs 318, 320 can manage MBMS content and resources. MCNs 318, 320 can allocate time and/or frequency resources to access nodes 314, 316 based on the MBMS mode. MCNs 318, 320 can also determine modulation and coding schemes used in the communication of the data transmissions using MBMS modes. When access nodes 314 and/or 316 transmit data using a MBSFN MBMS mode, MCNs 318, 320 can coordinate the transmission of the synchronized signals from different access nodes. Access nodes 314, 316 can be separate from MCNs 318, 320 or access nodes 314, 316 and MCNs 318, 320 can be integrated within a single node. In addition, MBMS content can be sent to MCNs 318, 320 before transmission from access nodes 314, 316 begins. MCNs 318, 320 can be MBMS gateway nodes.

Multicast content node 322 can be configured to transmit MBMS session content (e.g. user plane data) from the multicast service center node 326 to the MCNs 318, 320. When access nodes 314, 316 are configured to transmit in the MBSFN MBMS mode, multicast content node 322 can transmit the MBMS content based on multicast groups. A multicast group can be two or more access nodes identified to transmit a MBMS signal simultaneously over the same channel. The MBMS signals can be synchronized such that the wireless devices associated with the two or more access nodes receive multiple versions of the MBMS content where each version is associated with a differing delay. The delay can be based on the location of the wireless device with respect to each access node within the multicast group. Transmissions from access nodes of the multicast group can be sufficiently synchronized that each signal arrives the wireless devices associated with the multicast group within the cyclic prefix at the start of the symbol such that there is no inter-symbol interference (ISI). Access nodes identified for each multicast group can be neighboring and/or adjacent access nodes such that the multicast group transmits the MBMS content to a service area associated with all identified access nodes.

MCNs 318, 320 can comprise a processor and associated circuitry to execute or direct the execution of computer-readable instructions to obtain information. MCNs 318, 320 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. MCNs 318, 320 can receive instructions and other input at a user interface.

Controller node 324 can be configured to provide control information associated with the MBMS sessions to the MCNs 318, 320. For example, controller node 324 can provide content plane data such as signaling data or control information. Control information can include control information associated with network interface or session management. Controller node 324 can be a mobility management entity (MME).

Controller node 324 can comprise a processor and associated circuitry to execute or direct the execution of computer-readable instructions to obtain information. Controller node 324 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 324 can receive instructions and other input at a user interface.

Multicast service center node 326 can be configured to mediate between MBMS content providers and network operators. Multicast service center node 326 can be responsible for introducing MBMS content into communication system 300. When a plurality of multicast content nodes 322 are provided within communication system 300, multicast service center node 326 can be coupled to all multicast content nodes 322. The multicast service center node 326 can be responsible for both control plane data and user plane data of the MBMS service. Authentication and authorization of content providers and/or service providers can also be performed by the multicast service center node 326. The multicast service center node 326 can receive and modify MBMS content, for instance, by encrypting the MBMS content received from the content node 330 and transmit the encrypted data to the multicast content node 322 and controller node 324 for further transmission to the wireless devices 302, 304, 306, 308, 310, 312. Multicast service center node 326 can further provide service information based on services for both service announcement and bearer setup purposes, authenticate wireless devices wishing to join multicast sessions, and initiate an MBMS session start, modify, and stop signaling. The multicast service center node 326 can be a broadcast service center (BM-SC). Multicast service center node 326 can be a separate node or can be combined with other nodes.

Multicast service center node 326 can comprise a processor and associated circuitry to execute or direct the execution of computer-readable instructions to obtain information. Multicast service center node 326 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Multicast service center node 326 can receive instructions and other input at a user interface.

Communication network 328 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 328 can be capable of carrying data, for example, to support voice and data communications by a wireless device such as wireless devices 302, 304, 306, 308, 310, 312. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 328 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 328 can also comprise additional base stations, controller nodes, telephony switches, internet routers, network gateways, computer systems, communication links, or some other type of communication equipment, and combinations thereof.

Content node 330 can be an MBMS content provider. For example, content node 330 can be an internet protocol (IP) multicast servicer that is coupled to an infrastructure such as a server via a data network. The content node 330 can provide MBMS data in various forms such as IP data packets. The MBMS data can be streaming services such as multimedia, video on demand, webcast. MBMS data can, alternatively or in addition to streaming services, include background services (e.g. warning messages, bulk e-mail, short message services (SMS), downloading, local information, advertisements).

Content node 330 can comprise a processor and associated circuitry to execute or direct the execution of computer-readable instructions to obtain information. Content node 330 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Content node 330 can receive instructions and other input at a user interface.

Access node 314 can be in communication with MCN 318 through communication link 356. Access node 316 can be in communication with MCN 320 through communication link 358. MCN 318 can be in communication with MCN 320 through communication link 360, controller node 324 through communication link 362, and multicast content node 322 through communication link 364. MCN 320 can be in communication with multicast content node 322 through communication link 366 and controller node 324 through communication link 368. Multicast content node 322 can be in communication with controller node 324 through communication link 370 and in communication with multicast service center node 326 through communication link 372. Controller node 324 can be in communication with communication network 328 through communication link 374. Communication network 328 can be in further communication with multicast service center node 326 through communication link 376 and content node 330 through communication link 378.

Communication links 356, 358, 360, 362, 364, 366, 368, 370, 372, 374, 376, 378 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (Wi-MAX), or Long Term Evolution (LTE), or combinations thereof. Other wireless protocols can also be used. Links 356, 358, 360, 362, 364, 366, 368, 370, 372, 374, 376, 378 can be a direct link or might include various equipment, intermediate components, systems, and networks. Links 356, 358, 360, 362, 364, 366, 368, 370, 372, 374, 376, 378 can include multiple signals operating in a single pathway in a similar manner as wireless links 332, 334, 336, 338, 340, 342, 344, 346, 348, 350, 352, 354.

In operation, access node 314 can transmit data to wireless devices 302, 304, 306 over multicast communication links 344, 346, 348 in one or more consecutive sessions of finite duration using a first MBMS mode such as SC MBMS mode. Access node 316 can transmit data to wireless devices 308, 310, 312 over multicast communication links 350, 352, 354 in one or more consecutive sessions of finite duration using a first MBMS mode such as SC MBMS mode. Wireless devices 302, 304, 306, 308, 310, 312 can establish unicast communication links 332, 334, 336, 338, 340, 342 with the respective access nodes 314, 316. Wireless devices 302, 304, 306, 308, 310, 312 can monitor the respective MBMS data transmissions from access nodes 314, 316 using an error control method such as hybrid automatic repeat request (HARM). When a wireless device successfully receives a packet of MBMS data, the wireless device can send an ACK message to the respective access node. When a corrupted MBMS data packet is received, the wireless device 102 can transmit a retransmission request message, such as a NACK message. The number of retransmission request messages received by each access node 314, 316 can be monitored. When the number of retransmission request messages exceeds a threshold, access nodes 314 and/or 316 can be reconfigured to transmit data using a second MBMS mode such as MBSFN MBMS mode.

Figure 4:
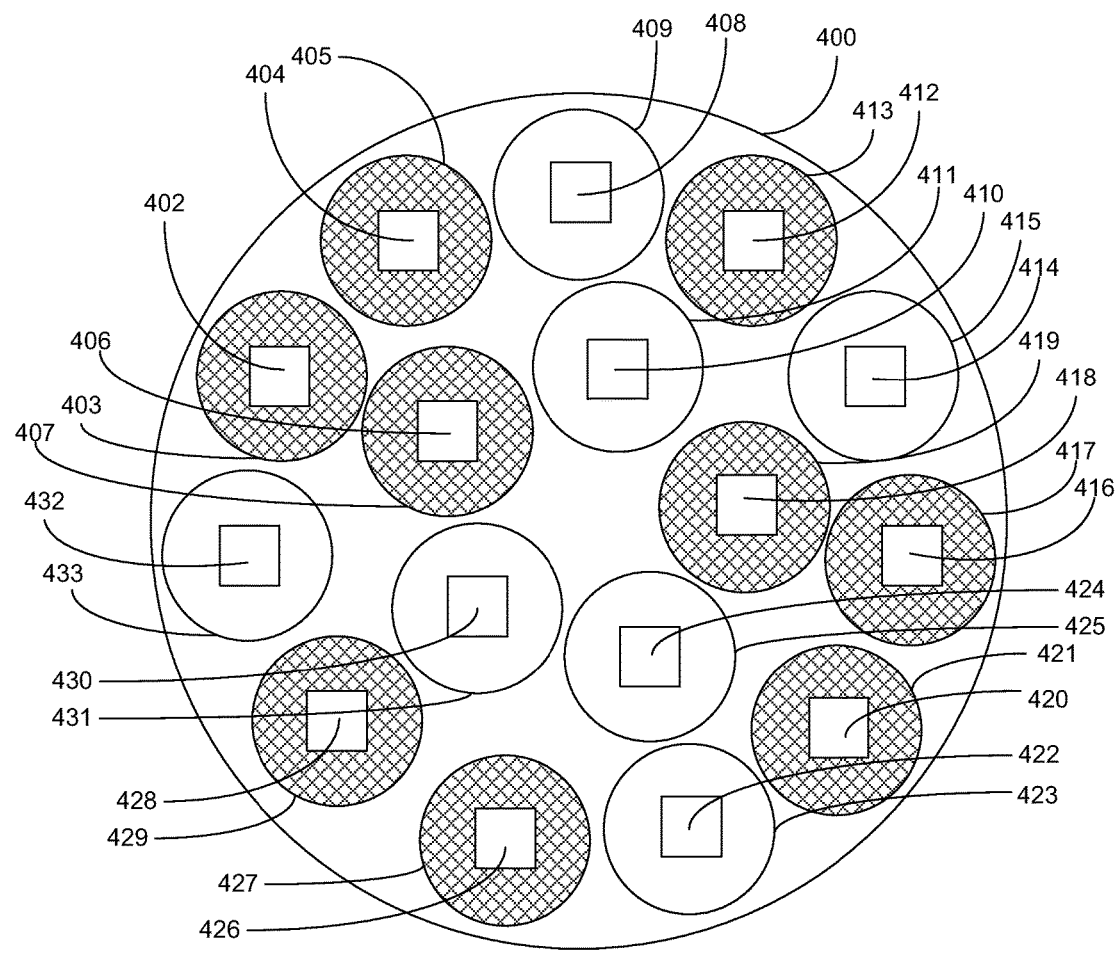
FIG. 4 illustrates an exemplary market area of a wireless communication system.

FIG. 4 illustrates an exemplary market area 400 of a wireless communication system. Market area 400 can be a portion of a geographic area served by a network operator. Market area 400 can include access nodes 402, 404, 406, 408, 410, 412, 414, 416, 418, 420, 422, 424, 426, 428, 430, 432. Each access node 402, 404, 406, 408, 410, 412, 414, 416, 418, 420, 422, 424, 426, 428, 430, 432 can be associated with a service area 403, 405, 407, 409, 411, 413, 415, 417, 419, 421, 423, 425, 427, 429, 431, 433 such that each service area can include a plurality of wireless devices (not illustrated) that are configured to receive MBMS data transmissions.

In an embodiment, access nodes 402, 404, 406, 408, 410, 412, 414, 416, 418, 420, 422, 424, 426, 428, 430, 432 can be monitored to determine a number of retransmission request messages ($\theta_i$) received by each access node. An identity of each wireless device receiving an MBMS signal within the service areas 403, 405, 407, 409, 411, 413, 415, 417, 419, 421, 423, 425, 427, 429, 431, 433 of the access nodes 402, 404, 406, 408, 410, 412, 414, 416, 418, 420, 422, 424, 426, 428, 430, 432 can be determined. For example, a list of the wireless devices engaged in MBMS services can be periodically compiled and the number of retransmission request messages associated with each wireless device can be periodically determined. When the number of retransmission request messages received at each access node exceeds a predetermined threshold, at least one multicast group can be identified.

For example, access nodes 402, 404, 406, 412, 416, 418, 420, 426, 428 can receive a greater number of retransmission request messages from the wireless devices associated with service areas 403, 405, 407, 413, 417, 419, 421, 427, 429 then the predetermined threshold. A multicast group associated with access nodes 402, 404, 406 can be identified, a multicast group associated with access nodes 416, 418, 420 can be identified, and a multicast group associated with access nodes 426, 428 can be identified. It is noted that multicast groups can include two or more adjacent and/or neighboring access nodes. Therefore, while access node 412 can receive a number of retransmission request messages above the predetermined threshold, access node 412 will not be included within a multicast group because no adjacent and/or neighboring access node is also receiving a number of retransmission request messages above the predetermined threshold.

For each identified multicast group, an anticipated MBMS service level of the group ($\alpha$) can be determined. For example, the anticipated MBMS service level of the group can be based on the number of retransmission request messages received at each access node in the group and the total number of wireless devices in the group receiving the MBMS service. (i.e. $\alpha = \Sigma \theta_i$/total number of wireless devices in the group).

In an embodiment, for the multicast group identified for access nodes 402, 404, 406, the anticipated MBMS service level for this group can be the sum of the number of retransmission request messages received at access node 402, 404, 406 divided by the total number of wireless devices receiving MBMS service within service areas 403, 405, 407.

In addition, an anticipated synchronization overhead ($\beta$) can be determined for each identified multicast group. For example, the anticipated synchronization overhead can be based on the number of access nodes transmitting MBMS services within the group and the total number of access nodes transmitting MBMS services within a predetermined geographic location, such as the market area. The larger the anticipated synchronization overhead the greater the amount of overhead anticipated if the access nodes 402, 404, 406 are reconfigured to transmit data in a MBSFN MBMS mode.

The anticipated MBMS service level of the group ($\alpha$) can be compared to a first threshold and the anticipated synchronization overhead ($\beta$) can be compared to a second threshold. When the anticipated MBMS service level of the group ($\alpha$) is greater than the first threshold and the anticipated synchronization overhead ($\beta$) is less than the second threshold, access nodes within the identified multicast group can be reconfigured to transmit using a second MBMS mode such as MBSFN MBMS.

This determination can be performed in any of the above discussed network nodes. For example, access nodes 104, 106, network node 108, access nodes 314, 316, MCNs 318, 320, multicast controller node 322, controller node 324, and multicast service center node 326.

While the above described determination are discussed with respect to configuring an access node from a SC MBMS mode to a MBSFN mode, one of ordinary skill in the art would appreciate that the present disclosure could further be used to configure access nodes from a MBSFN MBMS mode to a SC MBMS mode. Moreover, reconfiguring MBMS mode determinations can be performed dynamically and at various intervals.

Figure 5:
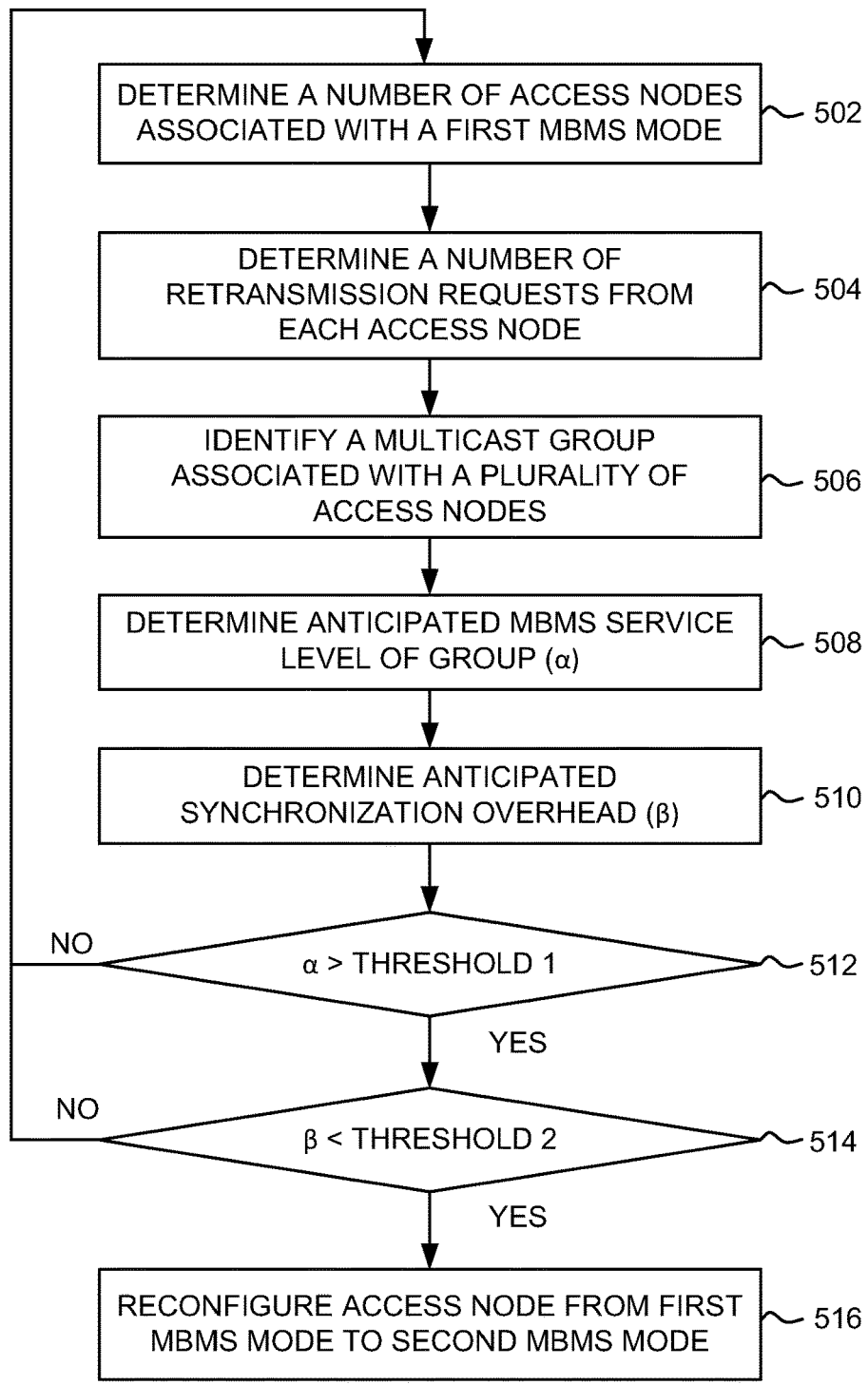
FIG. 5 illustrates another exemplary method of communicating with a wireless device in a wireless communication system.

FIG. 5 illustrates a flow chart of an exemplary method of communicating with a wireless device in a wireless communication system. The method will be discussed with reference to the exemplary communication systems 300, 400 illustrated in FIGS. 3 and 4. However, the method can be implemented with any suitable communication system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

A network node can determine a number of access nodes associated with a first MBMS mode at 502. For example, as illustrated in FIG. 3, multicast service center 326 can determine whether access nodes 314, 316 are transmitting data using a first MBMS mode such as SC MBMS mode. When access nodes 314, 316 are transmitting using the SC MBMS mode, the data can be transmitted on a channel unique to the service area of each access node 314, 316. For instance, wireless devices 302, 304, 306 can receive SC MBMS mode data transmissions from access node 314 and wireless devices 308, 310, 312 can receive SC MBMS mode data transmissions from access node 316.

A network node can determine a number of retransmission requests from each access node at 504 and identify a multicast group associated with a plurality of access nodes at 506. For example, multicast service center 326 can determine the number of retransmission requests from access nodes 314, 316. When the number of retransmission requests from each access node 314, 316 exceeds a predetermined threshold, the multicast service center 326 can identify a multicast group based on the number of retransmission requests. Multicast groups can include access nodes that are adjacent and/or neighboring and are experiencing a retransmission request message rate over a predetermined threshold. As illustrated in FIG. 4, a multicast group can be identified to include access nodes 402, 404, 406, another multicast group can be identified to include access nodes 416, 418, 420, and another multicast group can be identified to include access nodes 426, 428.

For each multicast group identified, an anticipated MBMS service level ($\alpha$) can be determined at 508 and an anticipated synchronization overhead ($\beta$) can be determined at 510. The anticipated MBMS service level ($\alpha$) can be based on the number of retransmission request messages received at each access node in the group and the total number of wireless devices in the group receiving the MBMS service. (i.e. $\alpha = \Sigma \theta_i$/total number of wireless devices in the group). The anticipated synchronization overhead ($\beta$) can be based on the number of access nodes transmitting MBMS services within the group and the total number of access nodes transmitting MBMS services within a predetermined geographic location, such as a market area. The larger the anticipated synchronization overhead, the greater the amount of overhead anticipated in access nodes within the identified group were reconfigured to transmit data in a MBSFN MBMS mode.

At 512, the anticipated MBMS service level of the identified group can be compared to a first threshold. When the anticipated MBMS service level of the identified group is greater than a first threshold, the anticipated synchronization overhead can be compared to a second threshold at 514. When the anticipated synchronization overhead is less than the second threshold, access nodes within the identified group can be reconfigured to transmit data in the second MBMS mode such as MBSFN MBMS mode from the first MBMS mode.

Figure 6:
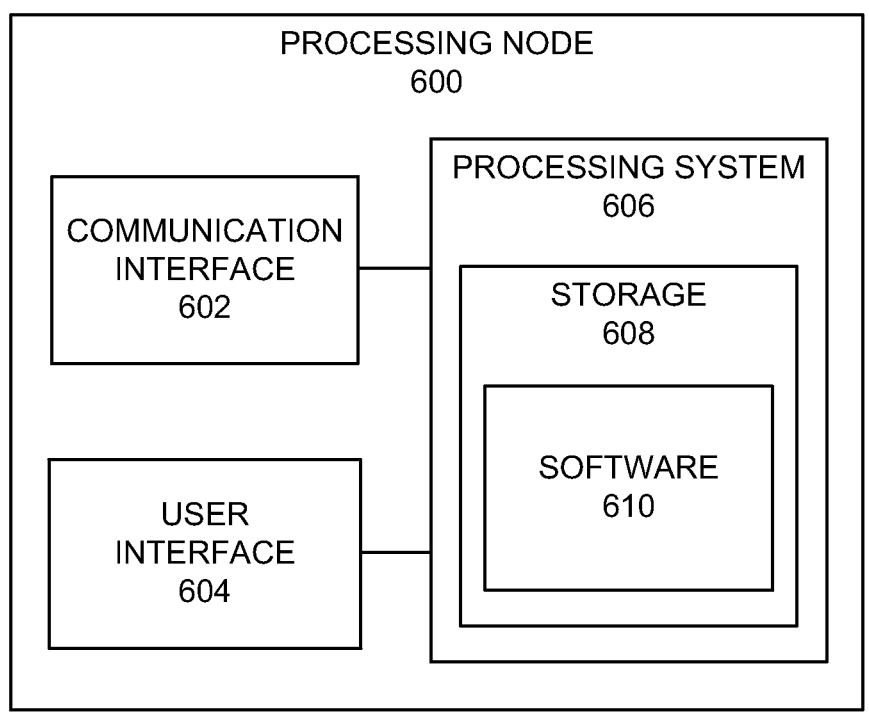
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 is capable of providing wireless communications in a communication network. Processing system 606 includes storage 608, which can comprise a disk drive, flash drive, memory circuitry, or other memory device. Storage 608 can store software 610 which is used in the operation of the processing node 600. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 108, 110, 308, 310, controller nodes 114, 314, and authorization node 316. Processing node 600 can also be an adjunct or component of a network element, such as an element of access nodes 108, 110, 308, 310, controller nodes 114, 314, and authorization node 316. Processing node 600 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
   determining at a network node a number of access nodes transmitting data using a first multimedia broadcast multicast services (MBMS) mode;
   determining a number of retransmission requests received at each access node transmitting data using the first MBMS mode;
   identifying a group of access nodes from among the number of access nodes based on the number of retransmission requests for each access node;
   determining an anticipated MBMS service level of the group of access nodes based on the number of retransmission requests for each access node;
   determining an anticipated synchronization overhead for the group of access nodes based on the number of access nodes transmitting data using the first MBMS mode; and
   reconfiguring at least one access node from among the group of access nodes to transmit data from the first MBMS mode to a second MBMS mode based on the anticipated MBMS service level and the anticipated synchronization overhead, wherein the reconfiguring is based on the number of retransmission requests received at the group of access nodes.

2. The method of claim 1, wherein the first MBMS mode is a single cell MBMS mode and the second MBMS mode is a Multimedia Broadcast Single Frequency Network MBMS mode.

3. The method of claim 1, wherein the retransmission requests are transmitted by at least one wireless device.

4. The method of claim 1, wherein the network node induces the retransmission requests.

5. The method of claim 1, wherein the retransmission requests are based on a hybrid automatic repeat request (HARQ) error detection system.

6. The method of claim 1, further comprising:
   receiving a list of wireless devices in communication with each access node transmitting data using the first MBMS mode,
   wherein reconfiguring the at least one access node from the first MBMS mode to the second MBMS mode is based on the identified access node group.

7. The method of claim 6,
   wherein the at least one access node is reconfigured to transmit data from the first MBMS mode to the second MBMS mode when the anticipated MBMS service level is less than a first predetermined threshold.

8. The method of claim 7, wherein the at least one access node is further reconfigured to transmit data using the second MBMS mode when the anticipated synchronization overhead is less than a second predetermined threshold.

9. The method of claim 1, wherein the retransmission requests are transmitted over a communication link different from a communication link associated with data transmitted using the first MBMS mode.

10. A wireless communication system comprising:
    a processing node configured to
    determine a number of access nodes transmitting data using a first multimedia broadcast multicast services (MBMS) mode;
    determine a number of retransmission requests received at each access node transmitting data using the first MBMS mode;
    identify a group of access nodes from among the number of access nodes based on the number of retransmission requests for each access node;
    determine an anticipated MBMS service level of the group of access nodes based on the number of retransmission requests for each access node;
    determine an anticipated synchronization overhead for the group of access nodes based on the number of access nodes transmitting data using the first MBMS mode; and
    reconfigure at least one access node from among the group of access nodes to transmit data from the first MBMS mode to a second MBMS mode based on the anticipated MBMS service level and the anticipated synchronization overhead, wherein the reconfiguring is based on the number of retransmission requests received at the group of access nodes.

11. The system of claim 10, wherein the first MBMS mode is a single cell MBMS mode and the second MBMS mode is a Multimedia Broadcast Single Frequency Network MBMS mode.

12. The system of claim 10, wherein the retransmission requests are initiated by at least one wireless device.

13. The system of claim 10, wherein the processing node requests the retransmission requests.

14. The system of claim 10, wherein the retransmission requests are based on a hybrid automatic repeat request (HARQ) error detection system.

15. The system of claim 10, wherein the processing node is further configured to:
    receive a list of wireless devices in communication with each access node transmitting data using the first MBMS mode,
    wherein reconfiguring the at least one access node from the first MBMS mode to the second MBMS mode is based on the identified access node group.

16. The system of claim 15,
    wherein the at least one access node is reconfigured to transmit data from the first MBMS mode to the second MBMS mode when the anticipated MBMS service level is less than a first predetermined threshold.

17. The system of claim 16, wherein the at least one access node is further reconfigured to transmit data using the second MBMS mode when the anticipated synchronization overhead is less than a second predetermined threshold.

18. The system of claim 10, wherein the retransmission requests are transmitted over a communication link different from a communication link associated with data transmitted using the first MBMS mode.

19. A method of operating a wireless communication system comprising:
    determining at a network node a number of access nodes transmitting data using a first multimedia broadcast multicast services (MBMS) mode;
    determining a number of retransmission requests received at each access node transmitting data using the first MBMS mode;
    identifying a group of access nodes from among the number of access nodes based on the number of retransmission requests for each access node;

determining an anticipated synchronization overhead for the group of access nodes based on the number of access nodes transmitting data using the first MBMS mode; and reconfiguring at least one access node from among the group of access nodes to transmit data from the first MBMS mode to a second MBMS mode when the anticipated synchronization overhead is less than a predetermined threshold, wherein the reconfiguring is based on the number of retransmission requests received at the group of access nodes.

\* \* \* \* \*